United States Patent
Hill

(10) Patent No.: US 9,863,768 B2
(45) Date of Patent: Jan. 9, 2018

(54) METHOD AND DEVICE FOR PROJECT LAYOUT USING LEVEL LASER LINES PROJECTED ONTO WORK SURFACE

(71) Applicant: Jayson Hill, Denver, CO (US)

(72) Inventor: Jayson Hill, Denver, CO (US)

(*) Notice: Subject to any disclaimer, the term of this patent is extended or adjusted under 35 U.S.C. 154(b) by 0 days.

(21) Appl. No.: 15/346,415

(22) Filed: Nov. 8, 2016

(65) Prior Publication Data

US 2017/0052026 A1    Feb. 23, 2017

Related U.S. Application Data

(63) Continuation-in-part of application No. 15/204,292, filed on Jul. 7, 2016, which is a continuation-in-part of application No. 14/602,430, filed on Jan. 22, 2015, now Pat. No. 9,518,823.

(60) Provisional application No. 61/930,645, filed on Jan. 23, 2014, provisional application No. 62/049,241, filed on Sep. 11, 2014.

(51) Int. Cl.
*G01C 15/04* (2006.01)
*G01C 15/00* (2006.01)

(52) U.S. Cl.
CPC ............................. *G01C 15/004* (2013.01)

(58) Field of Classification Search
USPC ..................... 33/227, 286, DIG. 21
See application file for complete search history.

(56) References Cited

U.S. PATENT DOCUMENTS

| | | | | |
|---|---|---|---|---|
| 5,493,786 A | * | 2/1996 | Thomson | G01B 21/02 33/1 G |
| 5,836,081 A | * | 11/1998 | Orosz, Jr. | A61B 5/0215 33/290 |
| 2005/0166408 A1 | * | 8/2005 | Liao | G01C 15/004 33/286 |
| 2006/0283029 A1 | * | 12/2006 | Jan | G01C 15/002 33/286 |
| 2007/0044331 A1 | * | 3/2007 | Yung | G01C 15/004 33/286 |
| 2010/0122466 A1 | * | 5/2010 | Hemingway | G01C 15/004 33/228 |
| 2012/0210589 A1 | * | 8/2012 | Marsland, Jr. | B82Y 20/00 33/286 |
| 2014/0237833 A1 | * | 8/2014 | Schubert | G01C 9/06 33/365 |
| 2015/0204666 A1 | * | 7/2015 | Hill | G01C 15/004 33/228 |
| 2016/0041359 A1 | * | 2/2016 | Gaskin | G01B 11/272 250/573 |

* cited by examiner

*Primary Examiner* — G. Bradley Bennett
(74) *Attorney, Agent, or Firm* — Kutak Rock LLP; Neil L. Arney

(57) ABSTRACT

A method and device for locating layout points on a work surface using a laser level located away from the work surface to project one or more visible laser lines onto the work surface and one or more portable devices removably attached to the work surface along the level laser lines projected onto the work surface.

11 Claims, 5 Drawing Sheets

METHOD AND DEVICE FOR PROJECT LAYOUT USING LEVEL LASER LINES PROJECTED ONTO WORK SURFACE

CROSS-REFERENCE TO RELATED APPLICATIONS

This application is a continuation-in-part and claims priority to co-pending U.S. application Ser. No. 14/602,430 filed Jan. 22, 2015, which application claims priority pursuant to 35 U.S.C. 119(e) to then co-pending U.S. Provisional Patent Applications, Ser. No. 61/930,645, filed Jan. 23, 2014, and Ser. No. 62/049,241, filed Sep. 11, 2014, the entire disclosures of which are incorporated herein by reference. This application is also a continuation-in-part and claims priority to co-pending U.S. application Ser. No. 15/204,292 filed Jul. 7, 2016.

FIELD OF INVENTION

The present invention relates to a method and device for laying out projects on a work surface using a laser level positioned away from a work surface and a portable device that may be attached to the work surface along the laser lines projected onto the work surface.

BACKGROUND

There are various tools on the market that utilize lasers. However, such tools are generally limited to providing reference laser lines and require the user to move the tool and interrupt the reference lines in order to complete complex layouts. What is needed is a device to facilitate leveling, layout, and installation of objects and fixtures, such as shelving, home décor, and tile without moving or interrupting the laser level continuously. Further what is needed is a device that accommodates measuring tools to allow the user to make measurements along the laser lines to facilitate the layouts.

SUMMARY OF INVENTION

The following summary is provided to facilitate an understanding of some of the innovative features unique to the present invention. The present invention is not intended to be limited by this summary.

The present invention relates to a method and device to facilitate leveling and installation of objects and fixtures, such as shelving and home décor on a wall or other work surface. In a preferred embodiment, the method of this invention uses a standard laser level placed away from the work surface, with the standard laser level projecting level laser lines onto the work surface. The level laser lines may be projected horizontally, vertically, or at other predetermined angles, and may include a combination of horizontal and vertical laser lines or laser lines at varying angles. One or more portable devices is removably located over a reference point on a wall or other work surface (a datum point) along the level laser lines projected onto the work surface. Each portable device will have a bull's eye or other opening at the center of the device to allow the device to be centered on a mark on the work surface. Each such device also will include one or more notches, protrusions, or other means for removably attaching an end of a tape measurer or other measuring device at or near the center of the portable device to allow the user to measure distances from the center of the portable device along the laser lines projected onto the work surface. In one embodiment, the notches, protrusions, or other means for attaching the tape measurer are offset from the center of the portable device so that the zero point on the tape measurer is centered on the portable device.

In an alternative embodiment, the portable device has one or more distance measuring lasers mounted at or near the center of the portable device to allow the user to measure distances along the projected laser lines using the distance measuring lasers. The inclusion of distance measuring lasers on the portable device allows the user to measure distances from the center of said base without the use of a tape measurer or other distance measuring device.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DESCRIPTION OF DRAWINGS

The accompanying figures are incorporated herein and form a part of the specification for the present invention and further illustrate the present invention.

DETAILED DESCRIPTION OF INVENTION

Figure 1:
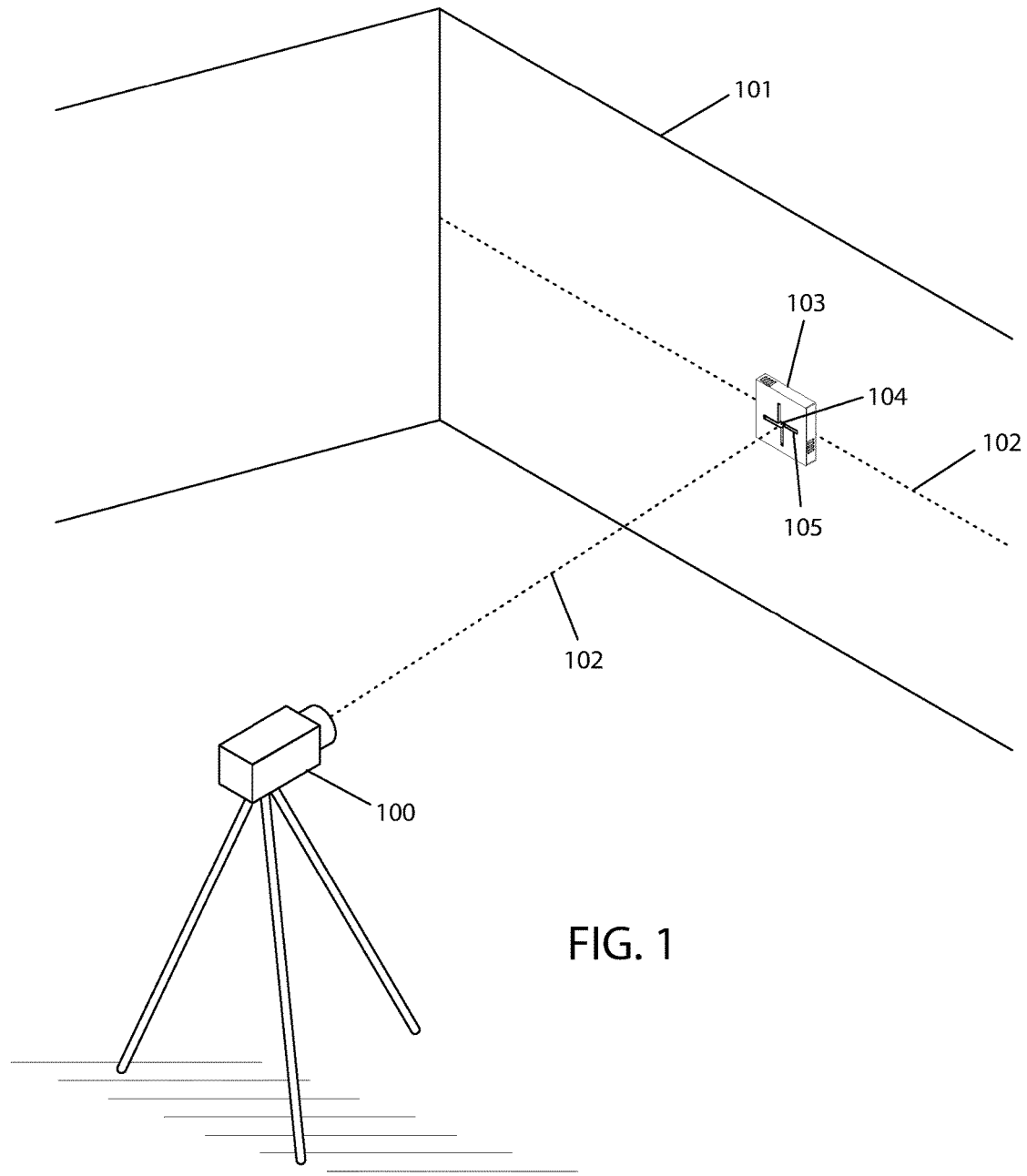
FIG. 1 is a perspective view of a laser level placed away from a work surface with a portable device removably attached to the work surface.

The present invention is best understood by reference to the drawings and description set forth herein. Embodiments of the invention are discussed below with reference to the drawings. However, those skilled in the art will readily appreciate that the detailed description given herein with respect to the drawings is for explanatory purposes as the invention extends beyond the limited embodiments described. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number for a claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations. However, the use of such phrases should not be construed to imply a claim recitation by the indefinite articles "a" or "an" limits any particular claim containing such claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of claim recitations is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

Throughout this disclosure, examples will be provided for using the laser leveling device. However, those skilled in the art will appreciate additional applications for the laser leveling device. Uses of the present invention may relate to, for example, hanging shelving, pictures, collages, art work, closet shelving, decorative shelving, curtain rods, towel bars, fixed hang holes, tile work, cabinets, built-in cabinets/shelving, kitchen cabinets, door hardware, wall mounted lighting fixtures, flat screen TV mounts, and other installations.

The invention provides a laser leveling device characterized by the use of a standard laser level placed away from the work surface and projecting level laser lines onto the work surface. Said level laser lines may be projected horizontally, vertically, or at other predetermined angles, and may include a combination of horizontal and vertical laser lines or laser lines at varying angles. One or more portable devices is removably located over a datum point on a wall or other work surface along the level laser lines projected onto the work surface. Each portable device has a bull's eye or other opening at the center of the device to allow the device to be centered on a mark on the work surface. Each such portable device will include one or more notches, protrusions, or other means for removably attaching an end of a tape measurer or other measuring device at or near the center of the portable device to allow the user to measure distances from the center of the portable device along a laser line projected on the work surface.

In an alternative embodiment, the portable device has one or more distance measuring lasers mounted at or near the center of the portable device to allow the user to measure distances along the projected laser lines using the distance measuring lasers. The inclusion of distance measuring lasers on the portable device allows the user to measure distances from the center of said base without the use of a tape measurer or other distance measuring device.

To illustrate embodiments of the present invention, reference is made to the drawings. FIG. 1 provides a prospective view of a preferred embodiment of the present invention using a standard laser leveling device 100 positioned away from a work surface 101 and projecting laser lines 102 onto the work surface. A portable device 103 is removably attached to the work surface 101 at a datum point along the projected laser lines 102. The portable device 103 has a bull's eye opening 104 at the center to allow the portable device 103 to be centered on a datum point on the work surface 101. The portable device 103 also includes notches 105 at or near the center of portable device 103 for removably attaching an end of a tape measurer or other measuring device at or near the center of the portable device 103 to allow the user to measure distances from the center of the portable device 103 along a laser line 102 projected on the work surface 101. Alternative embodiments may include protrusions or other means for removably attaching an end of a tape measurer or other measuring device at or near the center of the portable device 103 to allow the user to measure distances from the center of the portable device 103 along laser lines 102 projected on the work surface 101.

Figure 2:
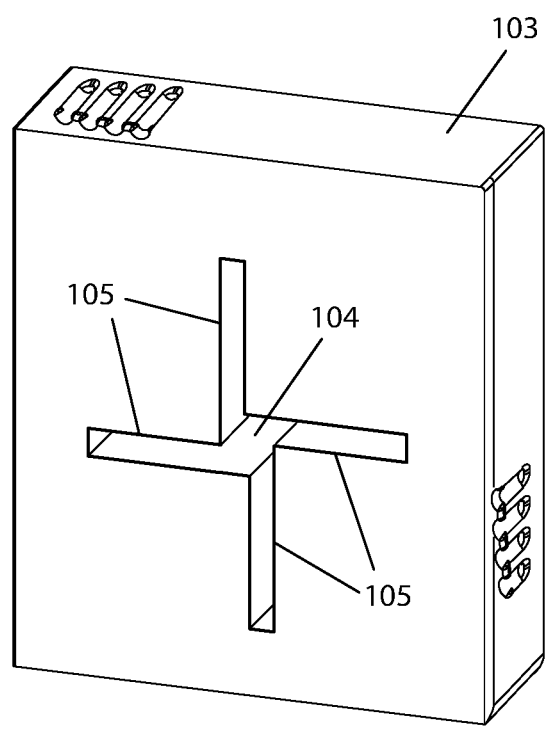
FIG. 2 is a top view of the portable device with notches for attaching the end of a tape measure.

FIG. 2 provides a top view of a portable device 103 with four notches 105 near the center of the device 103 to allow the user to measure distances from the center of the portable device 103 along a laser line 102 projected on the work surface 101. FIG. 2 also includes a bull's eye opening 104 at the center to allow the portable device 103 to be centered on a datum point on the work surface 101.

Figure 3:
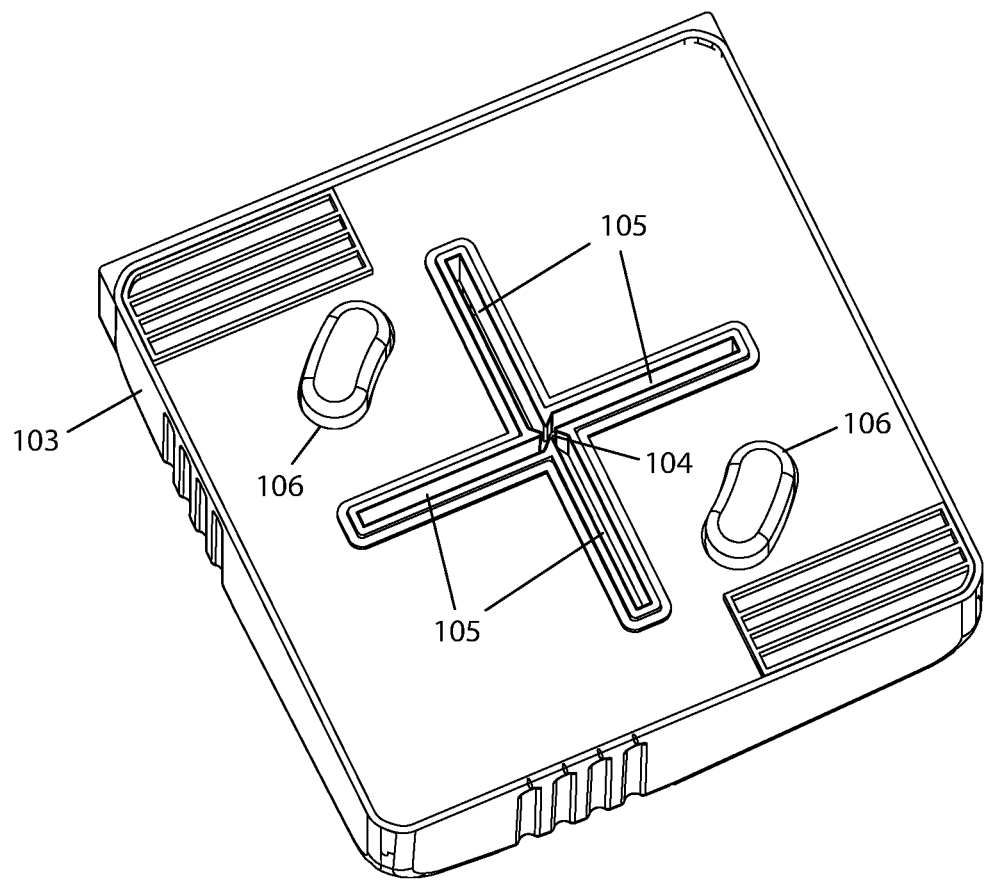
FIG. 3 is a bottom view of the portable device.

FIG. 3 is a bottom view of a preferred embodiment of a portable device 103 of the present invention showing the notches 105 for temporarily hooking the end of a tape measure or other measuring device and a bull's eye-type opening 104 at the center of a base 101. FIG. 3 also shows two stand-offs 106. The stand-offs 106 are spring loaded and will compress when pressed against a wall or other work surface. The stand-offs 106 allow the user to align and position the portable device 103 into a desired location on a work surface before temporarily adhering the portable device 103 to a work surface, using adhesive tabs, screws, other fasteners, other adhesive materials, or other means known in the art for removably affixing the portable device 103 to a work surface. The stand offs 106 ensure that the adhesive tabs do not adhere to a work surface until the user levels the portable device 103 and presses it onto a work surface.

Figure 4:
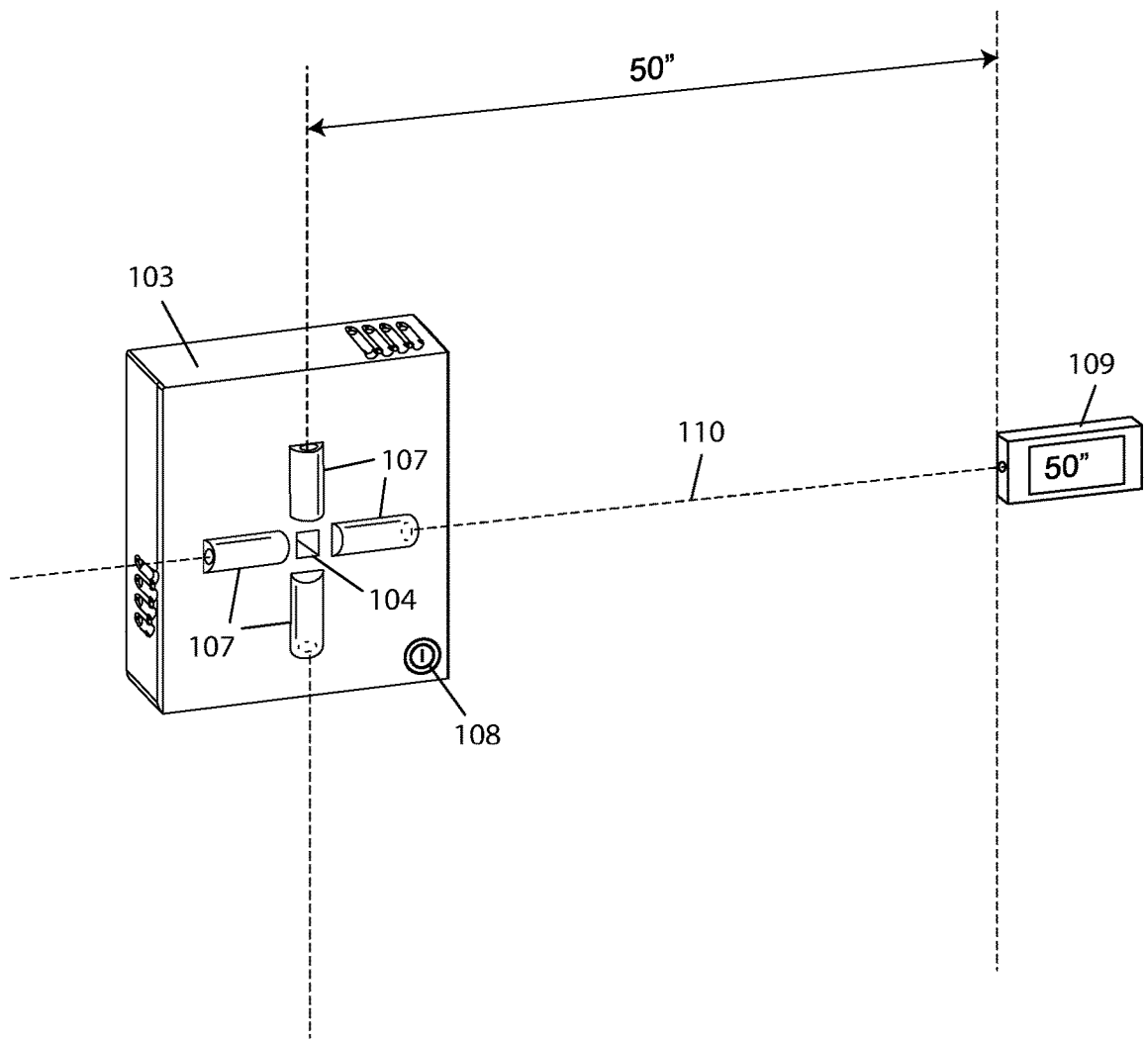
FIG. 4 is a top view of the portable device with distance measuring lasers and handheld display.

An alternative embodiment of the portable device 103 is provided in FIG. 4, which shows a top view of the portable device 103 of the present invention with a plurality of distance measuring lasers 107 located at or near the center of the portable device 103. FIG. 4 also shows a bull's eye opening 104 at the center of the portable device 103 for positioning the device 103 over a datum point on a work surface 101. FIG. 4 also shows a handheld display 109 for taking distance readings from the center of the portable device 103 using the distance measuring lasers 107.

Using a computer processor connected to the distance measuring lasers 107, each of the distance measuring lasers 107 is calibrated to provide distance measurements from the center of the portable device 103. When the portable device 103 is centered over a datum point, the distance from the datum point is measured. Included with the distance measuring lasers 107 on the portable device 103 are electronics (not shown in FIG. 3) known to one skilled in the art such as batteries or other sources of power for the distance measuring lasers 107, a power switch 108, a circuit board or other computer processor, and a means for wirelessly communicating with the handheld display 109. Distances are measured from the center of the portable device 103 located over a datum point on the work surface by powering on the plurality of distance measuring lasers 107, selecting the desired direction for measuring distance from the center of the portable device 103 and interrupting the laser beam 110 emitted from the distance measuring laser 107 pointed in said direction. The laser beam 110 emitted from the distance measuring laser 107 is interrupted using a handheld display 109.

In a preferred embodiment, the handheld display 109 has a LCD screen or other similar screen, electronic components known in the art, and communicates with the distance measuring lasers 107 located on the portable device 103 using Bluetooth or other means of wireless communication. When the handheld display 109 interrupts the selected distance measuring laser 107 the distance from the center of the portable device 103 is calculated and displayed on the LCD screen of the handheld display 109. When the handheld display 109 is moved along the emitted laser beam 110 for the selected distance measuring laser 107 the distance from the center of the portable device 103 will be displayed continuously and in real-time on the handheld display.

Figure 5:
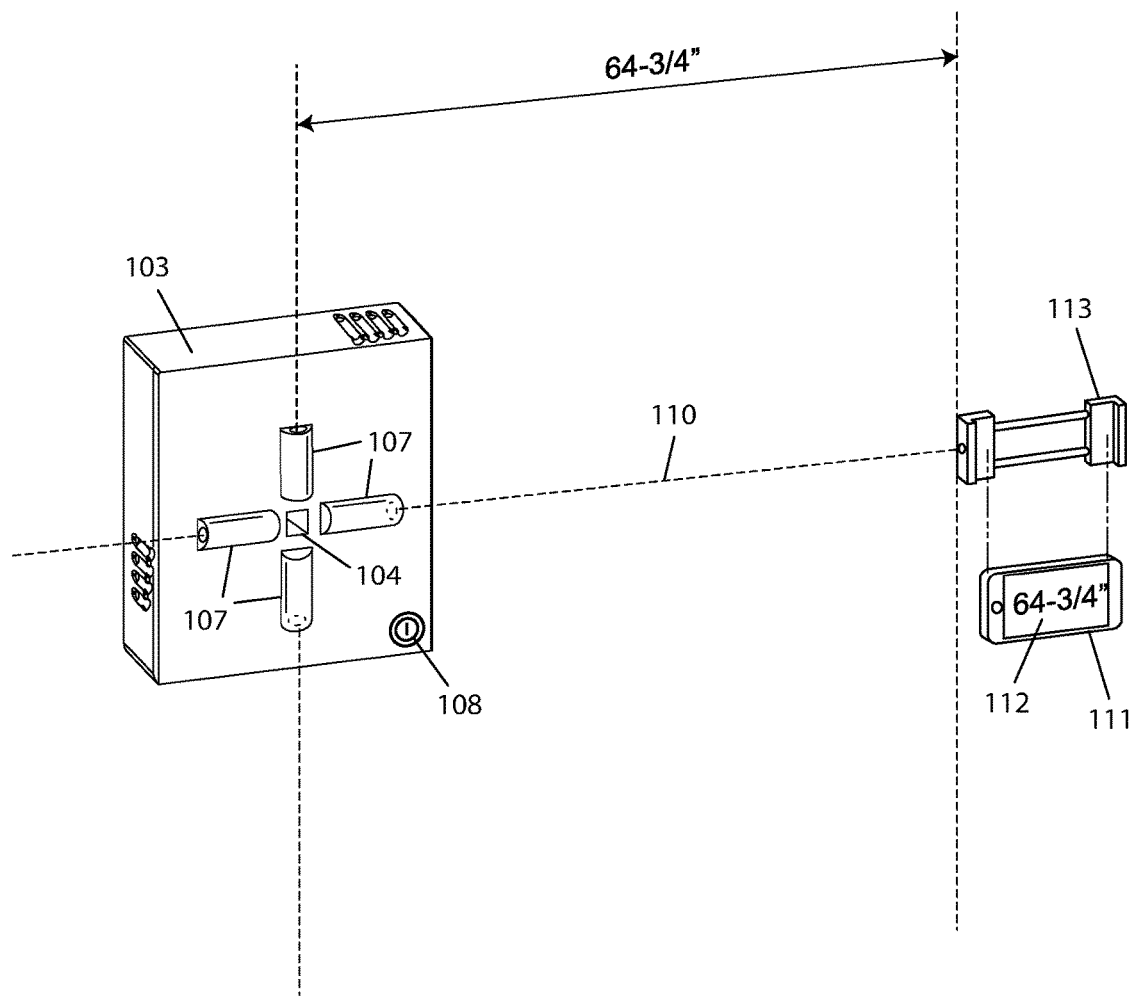
FIG. 5 is a top view of the portable device with distance measuring lasers and a smartphone as the handheld display.

In an alternative embodiment, as shown in FIG. 5, the handheld display 109 is a smartphone or other mobile device 111 that communicates by Blue Tooth or other wireless means with the distance measuring lasers 107 and includes a software application 112 that allows the smartphone 111 to calibrate and display distances from the center of the portable device 103 when the emitted laser beam 110 is interrupted. In such embodiment, a user may attach a side rail or an adjustable cradle 113 to the smartphone 111 to facilitate interruption of the laser beam 110 from one of the distance measuring lasers 107 and assist in placing marks on the work surface.

In a preferred embodiment of the present invention, the beams emitted from the distance measuring lasers 107 are not projected onto the work surface and are not generally visible to the user. In such preferred embodiment, the distance measuring lasers 107 are installed in one or more portable devices 103 and are rotatably or movably aligned to the same axes as the lasers 102 being projected onto the work surface. In this preferred embodiment, the user is able to measure distances along the projected laser 102 lines on the work surface by moving the handheld display 109 along the projected laser 102 lines thereby interrupting the beam 110 from the distance measuring lasers 107 that are aligned on the same axes as the projected lasers 102.

In an alternative embodiment, a single distance measuring laser 107 is rotatably installed at or near the center of a portable device 103, allowing a user to rotate the distance measuring laser 107 to different angles and measure the distance from the center of the portable device 103 at such different angles. In a further alternative embodiment, the handheld display 109 includes a stud finder to allow a user to identify studs in the work surface and measure the distance from the center of a portable device 103.

It is to be understood that the foregoing description is intended to illustrate and not limit the scope of the invention, which is defined by the scope of the appended claims. Other aspects, advantages, and modifications are within the scope of the following claims.

What is claimed is:

1. A method for locating layout points on a work surface comprising:
   removably attaching a portable device on the work surface over a datum point;
   leveling the portable device horizontally and vertically;
   locating a laser level away from the work surface so that the laser level projects one or more laser lines onto the work surface and one or more of the projected laser lines passes through the center of the portable device;
   removably attaching an end of a measuring device at the center of the portable device and using the measuring device to determine and mark a layout point along the projected laser lines on the work surface; and
   continuing to measure distances from the center of the portable device until all layout points have been determined and marked.

2. A method for locating layout points on a work surface using a plurality of portable devices comprising:

removably attaching a first portable device on the work surface over a first datum point;

leveling the first portable device horizontally and vertically;

locating a laser level away from the work surface so that the laser level projects one or more laser lines onto the work surface and one or more of the projected laser lines passes through the center of the first portable device;

removably attaching an end of a measuring device at the center of the portable device and using the measuring device to determine and mark second datum point and a third datum point along the projected laser line on the work surface;

removably attaching a second portable device and a third portable device over the second and third datum points on the work surface;

leveling the second portable and the third portable device horizontally and vertically;

adjusting the laser level so that one or more of the projected laser lines passes through the center of each of the second portable device and the third portable device;

removably attaching an end of a measuring device at the center of the second portable device and determining the proper location for said layout points along the projected laser lines passing through the center of the second portable device;

removably attaching an end of a measuring device at the center of the third portable device and determining the proper location for said layout points along the projected laser lines passing through the center of the third portable device; and continuing to measure distances from the center of the first, second and third portable devices until all layout points have been determined and marked.

3. A method for locating layout points on a work surface comprising:

removably attaching a portable device with a plurality of distance measuring lasers onto the work surface over a datum point;

leveling the portable device horizontally and vertically;

locating a laser level away from the work surface so that the laser level projects one or more laser lines onto the work surface and one or more of the projected laser lines passes through the center of the portable device;

activating one or more distance measuring lasers on the portable device, causing the distance measuring lasers to emit laser beams;

orienting the one or more of the plurality of distance measuring lasers mounted to the portable device, causing the emitted laser beams from said distance measuring lasers to be on the same axes as the projected laser lines on the work surface;

measuring distances from the center of the portable device along the projected laser lines using a handheld display that wirelessly communicates with the distance measuring lasers, wherein said handheld display is used to interrupt interchangeably the emitted laser beams from one of the distance measuring lasers and display the distance between the center of the portable device where said one of the distance measuring laser is mounted and the point where the handheld device interrupts said emitted laser beam; and continuing to measure distances from the center of the portable device using the distance measuring lasers until all layout points have been determined and marked.

4. A method for locating layout points on a work surface using a plurality of portable devices comprising:

removably attaching a first portable device on the work surface over a first datum point;

leveling the first portable device horizontally and vertically;

locating a laser level away from the work surface so that the laser level projects one or more laser lines onto the work surface and one or more of the projected laser lines passes through the center of the first portable device;

activating one or more of the plurality of distance measuring lasers on the first portable device, causing the distance measuring lasers to emit laser beams;

orienting the one or more of the plurality of distance measuring lasers mounted to the first portable device, causing the emitted laser beams from said distance measuring lasers to be on the same axes as the projected laser lines on the work surface;

measuring distances from the center of the first portable device to determine and mark a second datum point and a third datum point along the projected laser lines on the work surface;

measuring distances from the center of first portable device using a handheld display that wirelessly communicates with the distance measuring lasers, wherein said handheld display is used to interrupt interchangeably the emitted laser beams from one of the distance measuring lasers and display the distance between the center of the first portable device where said one of the distance measuring laser is mounted and the point where the handheld device interrupts said emitted laser beam;

removably attaching a second portable device with one or more distance measuring lasers and a third portable device with one or more distance measuring lasers over the second and third datum points on the work surface;

leveling the second portable device and the third portable device horizontally and vertically;

adjusting the laser level so that one or more of the projected laser lines passes through the center of each of the second portable device and the third portable device;

activating one or more of the plurality of distance measuring lasers on the second and third portable device, causing the distance measuring lasers to emit laser beams;

orienting the one or more of the plurality of distance measuring lasers mounted to the second and third portable devices, causing the emitted laser beams from said distance measuring lasers to be on the same axes as the projected laser lines on the work surface;

measuring distances from the center of the second and third portable devices to determine and mark the layout points on the work surface; and continuing to measure distances from the center of the first, second and third portable devices until all layout points have been determined and marked.

5. A portable device for locating layout points on a work surface, using a laser level located away from the work surface to project one or more visible laser lines onto the work surface, comprising:

a means for centering the portable device over a datum point located along one of the laser lines projected onto the work surface;

a means for removably attaching the portable device to the work surface; and a means for removably and interchangeably attaching the end of a measuring device near the center of the portable device so that distances from the center of the portable device and along the laser lines projected onto the work surface can be measured and marked to locate the layout points.

6. A portable device of claim 5 wherein the means for centering the portable device over a datum point is a bull's eye opening at the center of the portable device.

7. A portable device of claim 5 wherein the means for interchangeably attaching a measuring device near the center of the portable device is a plurality of notches located near the center of the portable device so that the measuring device measures distances from center of the portable device.

8. A portable device of claim 5 wherein the means for interchangeably attaching a measuring device near the center of the portable device is a plurality of protrusions located near the center of the portable device so that the measuring device measures distances from center of the portable device.

9. A portable device for locating layout points on a work surface, using a laser level located away from the work surface to project one or more visible laser lines onto the work surface, comprising:

a means for centering the portable device over a datum point located along one of the laser lines projected onto the work surface;

a means for removably attaching the portable device to the work surface;

one or more distance measuring lasers mounted near the center of the portable device;

a means for activating the one or more distance measuring lasers mounted to the portable device, causing the distance measuring lasers to emit laser beams along the work surface; and a handheld device that wirelessly communicates with the distance measuring lasers, wherein said handheld device is used to interrupt interchangeably the emitted laser beams from one of the distance measuring lasers and display the distance between the center of the portable device and the point where the handheld device interrupts said emitted laser beam.

10. A portable device of claim 9 wherein the means for centering the portable device over a datum point is a bull's eye opening at the center of the portable device.

11. A portable device of claim 9 wherein at least one of the laser beams emitted from the one or more distance measuring lasers is oriented on the same axis as at least one of the visible laser lines projected onto the work surface.

* * * * *